United States Patent Office.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN PLASTIC COMPOSITION.

SPECIFICATION forming part of Letters Patent No. 621,434, dated March 21, 1899.

Application filed December 21, 1898. Serial No. 699,898. (No specimens.)

*To all whom it may concern:*

Be it known that I, JOHN H. STEVENS, of the city of Newark, county of Essex, and State of New Jersey, have invented certain new and useful Improvements in Transparent Pyroxylin Plastic Compositions, of which improvements the following is a specification.

My compositions are intended principally for use in the arts as imitations of amber, glass, and tortoise-shell. I have found by a long experience that the essential characteristics for such imitations are solidity, transparency, plasticity under heat or capability of being pressed into different shapes in hot dies or otherwise when in a hard condition, and permanency or resistance to the action of time or elevated temperatures.

While the different ingredients from which I form my compositions are well known and at least one of them has been used or suggested to be used in connection with pyroxylin, they have not, so far as I am aware, been brought into the peculiar new relations which I have demonstrated form a composition possessing entirely new properties of great value in this art. The property of permanency in these transparent compounds is of extraordinary importance because it is closely associated with the danger of destructive fires and deterioration of valuable goods.

There are plenty of known means for securing stability in non-transparents or even in clouded transparents; but the arts demand a high transparency in order to successfully imitate amber and glass effects, and it has been extremely difficult to secure high transparency and stability at the same time. Hence any composition of matter which gives the desired properties has to depend on study and experiment, especially with proportions, the properties of substances, and their behavior under special conditions of manufacture, such as their reaction or compatibility with other necessary ingredients of the transparent compounds.

It frequently happens, as I have already pointed out in my United States Patent No. 519,987, that the mere employment of a substance in connection with pyroxylin does not necessarily disclose its usefulness or the peculiar properties which it may give the compound under various conditions of treatment or in various combinations. This is illustrated in the history of the art. Pyroxylin (which is a product of the action of nitric and sulfuric acids on cellulose, either in the form of cotton or paper) is by reason of its solubility in various menstrua a basis for a large variety of compounds whose applications are almost numberless. It is because of these many applications and the peculiar properties demanded for their many uses that inventors have given them so much attention. Many hundreds of patents have been issued both in this country and abroad for various processes, mixtures, and applications in this art. First, the pyroxylin itself has been made by many processes and subjected to various treatments; second, the compounds have been made by numerous special processes; third, liquid solvents in great variety have been discovered and applied; fourth, solid solvents or solvents which when melted by heat or dissolved in a liquid act on the pyroxylin have been discovered and used in great variety; fifth, various non-solvent substances have been used to modify the character of the compounds and render them susceptible of special application; sixth, special combinations or the association of old ingredients with new processes have advanced the art, and such is the peculiar nature of pyroxylin and its compounds that these special combinations of known ingredients and their uses with special processes have formed one of the most important fields for improvement, and, seventh, the applicability of special compounds to particular uses has formed the basis for numerous inventions.

The present invention is based on the discovery of new properties in certain solid bodies not necessarily in themselves solvents of pyroxylin and also in their action with other ingredients and the necessary proportions to be used, and its place in this field is best understood by referring to the history of a somewhat similar line of invention. Thus by some inventors certain inorganic salts have been proposed to be used to render pyroxylin compounds non-inflammable. Samples of such salts, for instance, are chlorid of calcium, chlorid of zinc, &c.; but in order to effect such results they must necessarily be used in large proportions to the amount of pyroxylin present. So, also, some other salts, such as chlorate of potash and nitrate of soda, have been added by some inventors to the explosive varieties of nitrocellulose in order to increase the explosive power. Still, again, certain salts have been proposed to be used when added to non-solvents of pyroxylin, like ethyl alcohol, in order to make the mixture a solvent of pyroxylin; but none of these uses is in any way analogous to my invention, which relates solely to the discovery that certain salts when added to proxylin compounds in certain proportions have the effect of neutralizing the nitrous acid developed in such compounds, and thereby tend to preserve these compounds from deterioration, while at the same time they do not interfere with the transparency of the compound, which is so desirable for many purposes. That the discovery of the utility of the salts mentioned in this specification for this purpose is foreign to the various inventions of prior inventors recited above is shown by the fact that many of the inorganic salts and equivalent substances mentioned by them as useful for the several purposes above referred to are wholly unsuited to the purpose of my invention. The salts that I refer to and which are included within my invention are known as the "potassium" salts of the volatile monatomic fatty acids. The principal acids of this group are formic, acetic, propionic, butyric, and valeric acids. The salts resulting from the chemical combination of these acids with potassium are potassium formate, potassium acetate, potassium propionate, potassium butyrate, and potassium valerate. These are the salts which form one part of my new transparent composition of matter, consisting, essentially, of pyroxylin, camphor, a liquid solvent, and an antacid or preserving substance, and of these salts I prefer potassium acetate. I have used these salts successfully and have determined by experiment their relative value for the purpose. While they all possess more or less antacid power, I prefer to use the salts which are most easily soluble, especially in alcohol or wood-spirit, because these are the solvents most commonly used in the art. While an ordinary mechanical mixture of the preserving agent with the pyroxylin compounds is sufficient to impart stability, the employment of a solution of the salt permits a better distribution, so that every part of the pyroxylin or its compounds is protected by reason of intimate contact with the salt.

In making my new composition I mix soluble pyroxylin with a liquid solvent and sufficient camphor to give the final product molding properties. The liquid solvent is preferably wood-spirit and is used in sufficient proportion to produce a mass which can be masticated in the rollers or mixing-machinery, although I do not confine myself to any particular proportion so long as the final result is a solid transparent compound. I introduce the antacid salt preferably in solution in wood-spirit, although it can be introduced in the form of powder, in which case the mastication with the solvent and other ingredients results in a thorough incorporation of the salt. The well-known menstrua acetate of methyl can be used in place of wood-spirit, if desired, or, in fact, any good solvent which will dissolve the antacid salt or permit it to become incorporated with the pyroxylin. As to proportions, I find that one per cent. of the salt, by weight, to the pyroxylin is sufficient for good results, while not more than three per cent. should be used. I have discovered in operating with these salts that those which dissolve most readily in the solvent used to form the compounds are the most powerful in their preserving effects.

The formate of potassium is more feeble in antacid power than the acetate, and is less easily soluble and gives only a moderate transparency. I would recommend that the formate of potassium be confined to products in which high transparency is not specially desired, and which are not to be subjected to severe conditions of treatment—like heat, for instance. Nevertheless, it is a fair antacid. The propionate and valerate of potassium are as powerful as the acetate; but the butyrate is also a strong antacid. The butyrate and valerate have a more or less offensive odor. All of these salts, with the exception of the formate, seem to be proportion for proportion superior to urea, as preservers. While the products made with them are more inclined to yellowness than urea-pyroxylin compounds, they possess the elements of efficiency and cheapness. They possess other advantages over some of the antacids heretofore used. For instance, pyroxylin compounds made with urea are sometimes contaminated by a product resulting from the reaction between the urea and the nitro elements present. This product is presumably nitrate of urea. At any rate compounds made with urea when subjected to severe treatment like heat in connection with metal plates are liable to a smearing of the surface of the sheets and a staining or smutching of the polishing-plates or metal dies. In using these potassium salts, especially those stated to be preferred, like potassium acetate, this does not occur, and imitation tortoise-shell sheets, for instance, made with potassium acetate as the preserving agent present a better surface, and the polishing-plates last longer than is the case with urea compounds.

The art of manufacturing transparent pyroxylin compositions is well known, as is also the difficulty which the operators have experienced in making these compositions so that they would be unchangeable by time or the influence of elevated temperatures, such as are used in molding. Many antacid substances have been used for this purpose, but as a rule they have failed to give the requisite transparency, either by lack of solubility in the menstrua employed or non-compatibility in other respects.

While I only confine myself to the proportions and ingredients necessary to produce solid transparent compositions, I would state that good proportions are, by weight, one hundred parts of soluble pyroxylin, forty to fifty parts of camphor, fifty to seventy-five parts of wood-spirit, and one part of potassium acetate. I have discovered that solvents in which the potassium acetate is insoluble can be used with the compound, provided the antacid salt is first dissolved in wood-spirit. I have also discovered that camphor, which by itself is incompatible with these potassium salts, is entirely compatible with them when used as described. There is no separation nor consequent cloudiness, which would be fatal to the effects desired. I prefer the roll method of conversion.

I confine myself to using no more than three per cent. of the potassium salt to the amount of pyroxylin. More than this would make a compound unsuited for my purposes, as it would either lack the requisite transparency or possess other undesirable properties. For instance, I find that five per cent. of the potassium acetate to the pyroxylin gives my mixture a brown color and the seasoned material is unfit for molding operations, as it turns dark, partially decomposes, and sticks to metal. The compounds made with five per cent. of potassium propionate decompose easily when heated in seasoned condition. This is the general tendency of this entire group of potassium salts when the top limit of three per cent. is reached, so that in excessive proportions they do not indicate the preserving action which they possess when about one per cent. is used. As a rule I would recommend the use of one per cent. of the antacid salt as a good general proportion, especially as one per cent. gives better effects and better transparency than larger proportions; but I have successfully used less than one per cent. in cases where a high transparency was not required. With excessive proportions what little transparency may be possessed by the compound disappears and the products turn clouded, become brittle, and stain the polishing-plates when heated.

While I am unable to explain why a basic substance already saturated with an acid can act as a preserving agent and prevent the deleterious action of the corrosive nitro compounds in decomposing pyroxylin, my experiments have nevertheless demonstrated this to be a fact. I can only state that it seems to depend on the nature of the acid radical present in the preserving agent. Even when the elements contained in these preserving-salts are united to other substances—for instance, the neutral salts containing dissimilar acid radicals—the resultant compound salt possesses preserving power, at least in proportion approximating to the amount of such element present. As an instance of the effect of the nature of the acid radical present in the preserving salts I can state that I have found by experiment that, while potassium acetate is a good antacid substance in connection with pyroxylin, potassium phosphate has so little antacid power in it that my tests have failed to disclose it and, at any rate, can be considered as totally inefficient as an antacid for my compositions. Very often a substance dissolves in wood-spirit and forms a close highly-transparent combination with the pyroxylin compounds, while it is of no use for antacid purposes. In fact, hygroscopic substances, as some of the chlorids—for instance, chlorid of calcium—while they may be capable, in connection with alcohol, of making a "celluloid" useful for artificial silk, filaments for lamps, and a certain class of varnishes, are totally incapable of forming a useful imitation of amber, tortoise-shell, or glass having the requisite surface effects and chemical stability. I have long known by experience that chlorid-of-calcium compounds attract moisture and become wet on the surface, which property would prevent the sale of such articles as tortoise-shell combs, amber pipe-bits, or transparent sheets for decorative purposes, for all of which my invention is specially applicable. While the solution of chlorid of calcium on the surface can be washed away to some extent, it is always liable to exude from the body of the material and form fresh deposits. Such materials are either incapable of polish or will not retain their polish by reason of this exudation.

I am aware that potassium carbonate has been used as an antacid in pyroxylin compounds. In this case the theory is that the potassium is combined with a non-corrosive and harmless acid radical which when released immediately passes off in the gaseous state. The pyroxylin products made with carbonate of potassium are not as transparent as those made with acetate of potassium, and the preserving power of the acetate is higher. Its penetrating power also gives it superiority over the carbonate. The carbonate of potassium is quite distinct also by reason of its insolubility in alcoholic menstrua.

By "solid transparent pyroxylin compounds" I mean those which permit the transmission of light—for instance, sheets, rods, or articles made in imitation of amber, glass, tortoise-shell, and horn.

I am aware that the potassium acetate has been claimed as a solvent in connection with grain-alcohol in certain proportions and as a substitute and equivalent for calcium chlorid and other chlorids of the metals and alkaline earths, as well as oxalic, citric, and carbolic acids. These substances are not equivalents in my invention, as I have pointed out. My experiments have demonstrated that all proportions in which the potassium acetate has been recommended to be used would fail to give a final transparent composition of matter. I am not aware, therefore, that the acetate of potassium has ever been used in making a plastic or moldable imitation of glass, horn, amber, and tortoise-shell, or that it has been used in such proportions as would form such a composition, or that any one before my experiments and reduction to practice of this invention has known or described the valuable preserving property of potassium acetate in my compounds or has even suggested its utility with camphor.

While I have found that potassium acetate and the rest of my new group are applicable as antacids for purposes outside of the transparent pyroxylin compounds of the present invention—for instance, smokeless powders and lacquers—nevertheless as there are other suitable antacid substances useful for non-transparent compounds and because of the extraordinary utility of these new antacid substances in solid transparent moldable compounds I have confined my claims to this class of compounds.

Wherever I have mentioned "camphor" it is to be understood that I can employ any equivalent solid solvent which will give the compound the molding property or the property of plasticity under heat, as is well understood. Many such substances are known. I do not therefore claim the broad use of these new antacid substances with pyroxylin in all proportions; but I include in my invention any use of my proportions of potassium acetate or the rest of the group in a solid transparent compound as a practice of my invention, whether the compound is made as I have described or by adding to an ordinary transparent camphor compound sufficient alcohol and potassium acetate to give my proportions and results, for I have found that the usefulness of the potassium acetate as an antacid in my compounds was unknown in the art until I made my invention. For the reasons above described I include in my invention the present group of potassium salts of the volatile monatomic fatty acids as preserving agents for transparent pyroxylin compounds, whether the salts are simple, compound, mixed, or combined chemically with other salts or compounds; but I exclude any combination of the salts of this specification with the halogen acids, for such compounds have already been secured by me in United States Patent No. 614,514, of November 22, 1898, which patent includes such substances, for instance, as chlorformate of potassium, chloracetate of potassium, chlorpropionate of potassium, &c.

Having thus fully described my invention, what I claim, and desire to secure by Letters Patent, is—

1. A solid transparent composition of matter consisting of pyroxylin, camphor, a liquid solvent, and a preserving potassium salt of a volatile monatomic fatty acid, the said salt being present to no greater extent than three per cent. by weight to the amount of pyroxylin in the compound, substantially as described.

2. A solid transparent composition of matter consisting of pyroxylin, camphor, and a preserving potassium salt of a volatile monatomic fatty acid, the said salt being present to no greater extent than three per cent. by weight to the amount of pyroxylin in the compound, substantially as described.

3. A transparent composition of matter containing pyroxylin, camphor, and potassium acetate, the said salt being present to no greater extent than three per cent. by weight to the amount of pyroxylin in the compound, substantially as described.

JOHN H. STEVENS.

Witnesses:
RALPH ROOKSBY,
ABRAHAM MANNERS.